(12) United States Patent
Schlabach et al.

(10) Patent No.: US 7,959,411 B2
(45) Date of Patent: Jun. 14, 2011

(54) IN-PIPE HYDRO-ELECTRIC POWER SYSTEM AND TURBINE

(75) Inventors: Roderic A. Schlabach, Goshen, IN (US); Mark Rydell Cosby, Goshen, IN (US); Edward Kurth, San Antonio, TX (US); Igor Palley, Madison, NJ (US); Greg Smith, Poway, CA (US)

(73) Assignees: Northwest Pipe Company, Vancouver, WA (US); Lucid Energy Technologies, LLP, San Antonio, TX (US)

( * ) Notice: Subject to any disclaimer, the term of this patent is extended or adjusted under 35 U.S.C. 154(b) by 67 days.

(21) Appl. No.: 12/384,765

(22) Filed: Apr. 7, 2009

(65) Prior Publication Data

US 2010/0253081 A1   Oct. 7, 2010

(51) Int. Cl.
F03D 3/00 (2006.01)
(52) U.S. Cl. .............. 416/227 A; 415/229; 415/907
(58) Field of Classification Search ......... 415/4.2, 415/4.4, 229, 907; 416/76, 178, 198 A, 227 R, 416/227 A, 243, DIG. 9; 290/43, 44, 54, 290/55
See application file for complete search history.

(56) References Cited

U.S. PATENT DOCUMENTS

| | | | | |
|---|---|---|---|---|
| 1,835,018 A | * | 12/1931 | Darrieus | ............... 415/224 |
| 2,020,900 A | * | 11/1935 | Methvin | ............... 416/227 R |
| 4,012,163 A | * | 3/1977 | Baumgartner et al. | .... 415/208.3 |
| 4,377,091 A | | 3/1983 | DeCarlo et al. | |
| 5,038,049 A | | 8/1991 | Kato | |
| 5,183,435 A | | 2/1993 | Galvez | |
| 5,203,672 A | * | 4/1993 | Wolf | ............... 415/2.1 |
| 5,405,246 A | | 4/1995 | Goldberg | |
| 5,451,137 A | | 9/1995 | Gorlov | |
| 5,531,567 A | * | 7/1996 | Hulls | ............... 416/87 |
| 5,642,984 A | | 7/1997 | Gorlov | |
| 5,680,032 A | | 10/1997 | Pena | |
| 6,036,443 A | | 3/2000 | Gorlov | |
| 6,155,892 A | | 12/2000 | Gorlov | |
| 6,253,700 B1 | | 7/2001 | Gorlov | |
| 6,293,835 B2 | | 9/2001 | Gorlov | |
| 6,798,082 B1 | * | 9/2004 | Chen | ............... 290/55 |
| 7,156,609 B2 | | 1/2007 | Palley | |

FOREIGN PATENT DOCUMENTS

KR   10-2008-0046773   5/2008

OTHER PUBLICATIONS

PCT Search Report and Written Opinion dated Oct. 26, 2010, PCT/US10/028378, In't filing date Mar. 24, 2010.
U.S. Appl. No. 12/661,566, filed Mar. 19, 2010, Office Action Mailed Oct. 12, 2010.

* cited by examiner

*Primary Examiner* — Ninh H Nguyen
(74) *Attorney, Agent, or Firm* — Harmohinder S. Bedi; EcoTech Law Group, P.C.

(57) ABSTRACT

A generally spherical turbine configured to rotate transversely within a cylindrical pipe under the power of fluid flowing either direction therethrough is operatively coupled with a rotating machine or generator to produce electricity. In one embodiment, the blades of the spherical turbine curve in an approximately 180 degree arc in a plane that is at an inclined angle relative to the rotational axis of a central shaft. In another embodiment, a deflector is provided upstream of the spherical turbine and within the cylindrical pipe to control flow through the spherical turbine by shielding a part thereof. The blades of the spherical turbine are airfoil in cross section to optimize hydrodynamic flow, to minimize cavitation, and to maximize conversion from axial to rotating energy.

30 Claims, 5 Drawing Sheets

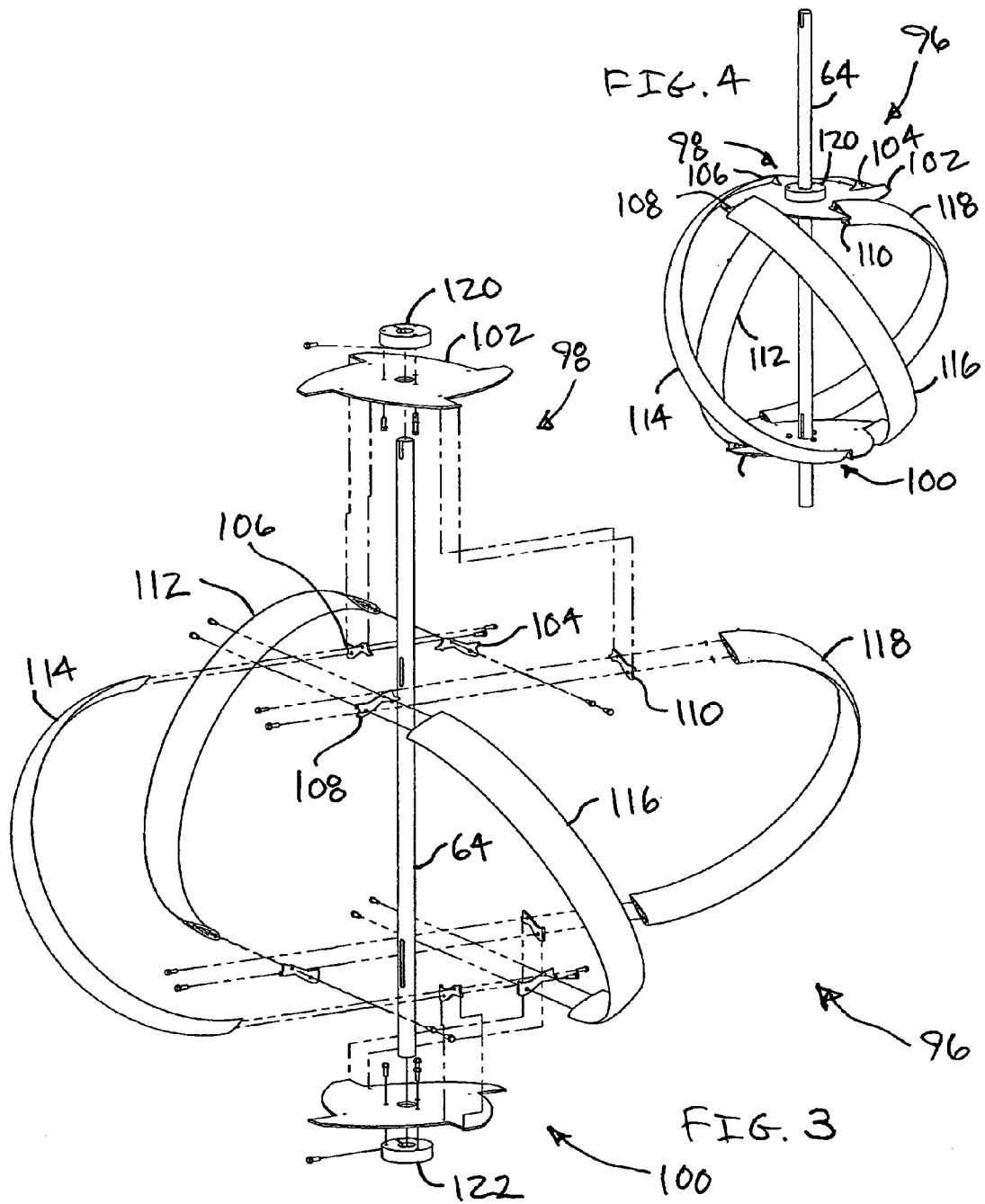

Detail A

Detail B

US 7,959,411 B2

IN-PIPE HYDRO-ELECTRIC POWER SYSTEM AND TURBINE

FIELD OF THE INVENTION

The invention relates generally to the field of hydroelectric power generation. More particularly, the invention relates to hydro-electric power generation via fluid flow past a turbine.

BACKGROUND OF THE INVENTION

U.S. Pat. Nos. 5,451,137; 5,642,984; 6,036,443; 6,155,892; 6,253,700 B1; and 6,293,835 B2 to Gorlov disclose various cylindrical turbines for power systems, the blades of the turbines extending helically to sweep out an open cylinder. The patents disclose mounting such turbines in rectangular and/or square cross-sectional channels or ducts capable of conveying water that rotates the turbines to generate hydroelectric power. Gorlov's cylindrical turbine has helically curved/twisted blades or vanes mounted to a central shaft by radial struts or spokes of seemingly arbitrary or at least non-airfoil, e.g. circular, cross section. U.S. Pat. No. 5,405,246 to Goldberg discloses a vertical-axis wind turbine with a twisted blade configuration in which two rotatable blades are bent and twisted along their entire lengths to define a body of rotation, with the body of rotation describing "the outer surface of an American football . . . ". In the only illustrated embodiment of his invention, Goldberg's blades butt radially against the central rotor at approximately 45 degree angles to imaginary planes at rotational poles normal to his rotor's axis.

BRIEF DESCRIPTION OF THE DRAWINGS

FIG. 3 is an isometric exploded assembly drawing of the spherical turbine of FIG. 1.

FIG. 4 is an isometric view of the assembled spherical turbine.

DETAILED DESCRIPTION OF THE PREFERRED EMBODIMENTS

Figure 1:
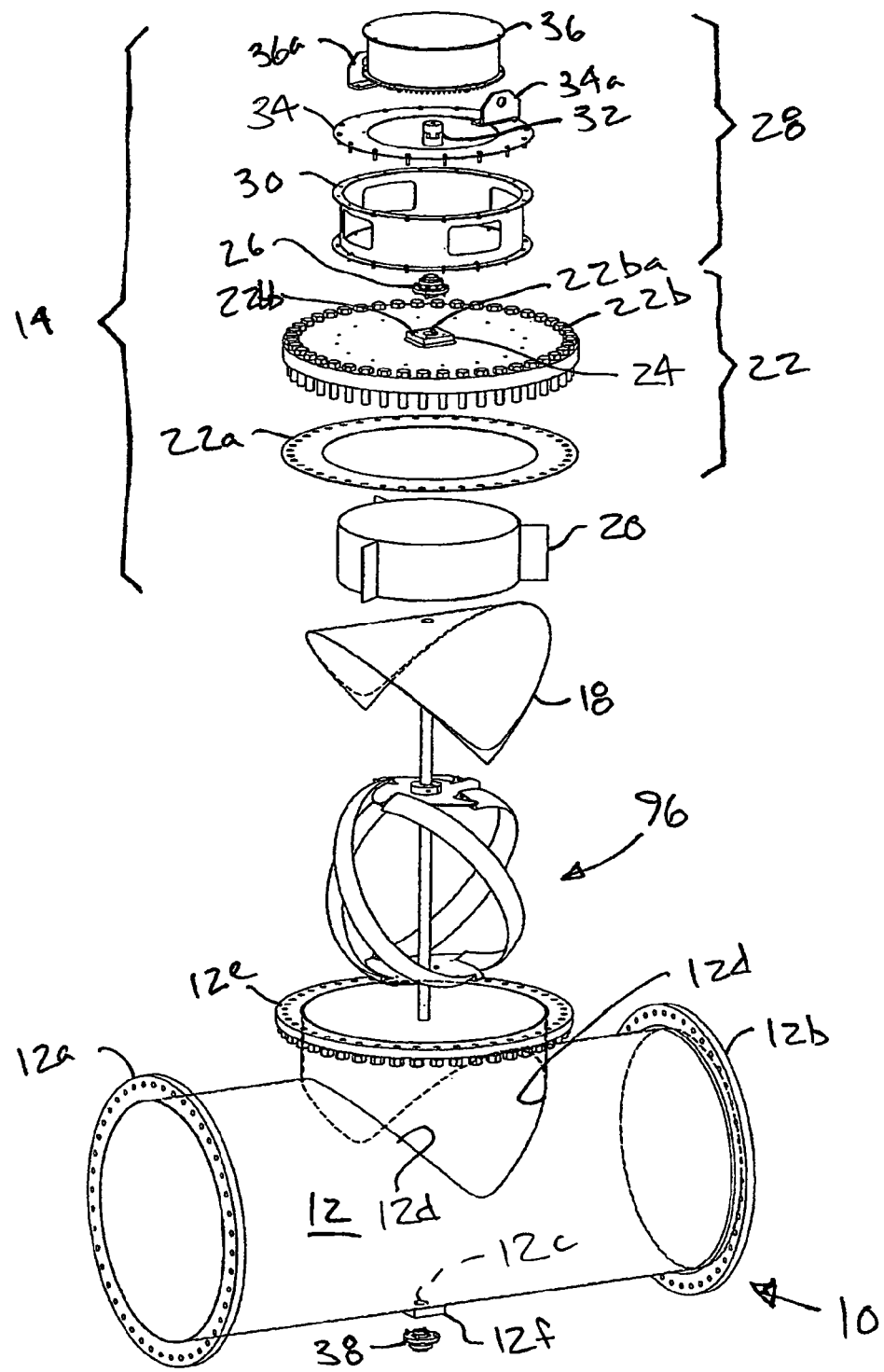
FIG. 1 is an isometric exploded assembly drawing of one embodiment of the invention featuring a spherical turbine.

FIG. 1 is an isometric exploded assembly drawing of a first embodiment of the invented in-pipe hydro-electric power system 10 featuring a spherical turbine. System 10 in accordance with one embodiment of the invention includes a T-section fluid (broadly encompassing a liquid such as water or a gas such as air or the like material exhibiting useful flow characteristics) pipe 12, a bulkhead or generator assembly 14, and a spherical turbine assembly 96. Those of skill in the art will appreciate, by brief reference to FIG. 2, that when assembled and driven by fluid flow through pipe 12, turbine assembly 96 rotates and system 10 produces hydro-electric power that can be stored, consumed, or fed into a power grid.

Pipe 12 is generally cylindrical, having a generally circular cross section, although within the spirit and scope of the invention it can be slightly oval in cross section. Pipe 12 typically is a part of a longer and perhaps more complex fluid conveyance or pipe system, and it will be appreciated that an existing pipe system can readily be retrofitted with invented power system 10 by sectioning and replacing the removed section with power system 10. Thus, pipe 12 is equipped with circular flanges 12a and 12b for bolting on either end to upstream and downstream pipe ends (not shown). Pipe 12 is provided with a small opening 12c in a first region of the sidewall and a large opening 12d in a diametrically opposed region thereof. As will be seen, small opening 12c accommodates a shaft of the turbine therethrough, while large opening 12d accommodates turbine assembly 96 therethrough. Pipe 12 also is equipped with a flanged T-intersection pipe section (a so-called "tee") that effectively mates large opening 12d at a right angle to the long axis of pipe 12.

Generator cap assembly 14 includes a circular arched plate 18 that effectively acts to cover or close off larger opening 12d when system 10 is assembled. Arched plate 18 provides a contiguous round wall inside pipe 12 for the fluid to flow past, thereby avoiding cavitation or other smooth fluid flow disruption within what would otherwise act as a pocket volume within the tee section. A 3-vaned, cylindrical spacer 20 holds arched plate 18 in place within the tee section when a cover plate 22 including an annular seal 22a and a circular plate 22b is bolted onto flange 12e. Circular plate 22b has an opening 22ba therein with a mounting block 24 extending therearound. A first mount 26 including a roller bearing assembly mounts a distal end of the shaft of turbine assembly 96 for smooth rotation therethrough. A flat shim 22bb can be provided between mounting block 24 and circular plate 22b.

Figure 6A:
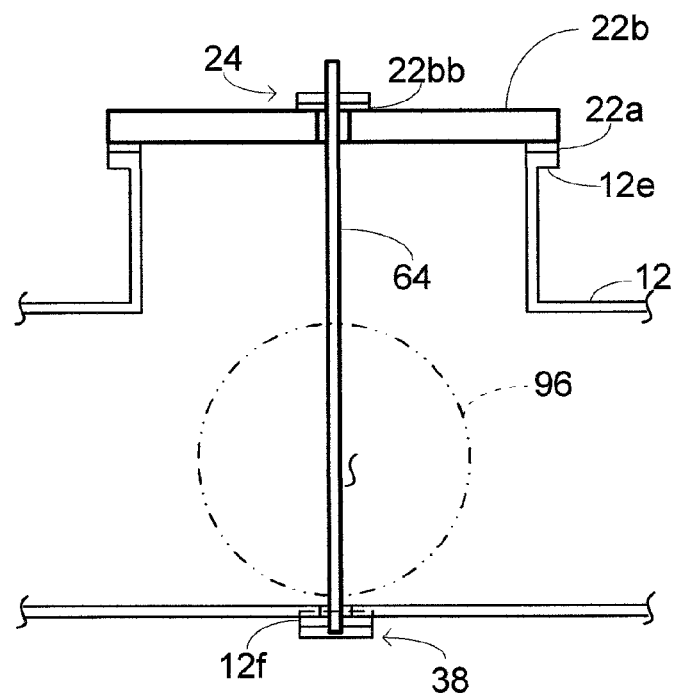
FIG. 6A shows a side-sectional view of the pipe of FIG. 1 including a turbine and circular plate for mounting a proximal end of the turbine's shaft.
Figure 6B:
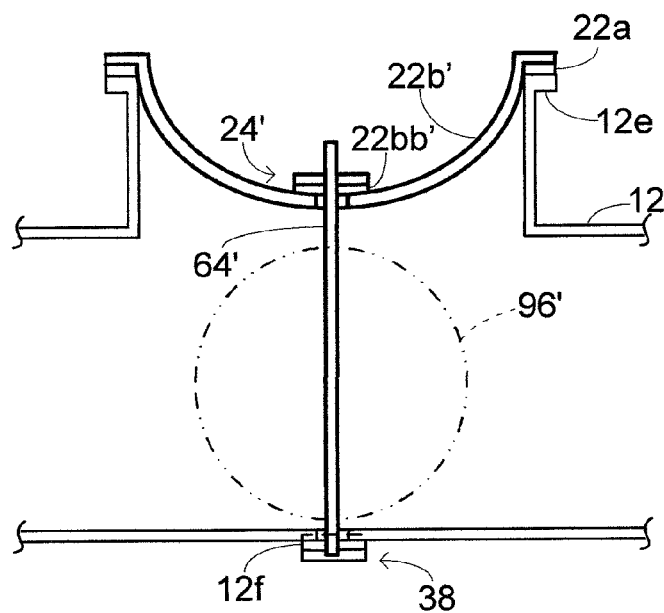
FIG. 6B shows a side-sectional view of the pipe of FIG. 1 including a turbine and a spherically, concave and circular plate for mounting a proximal end of the turbine's shaft.

An alternative to the above circular plate 22b is illustrated in FIGS. 6A and 6B, which are fragmentary cut-away side elevations featuring the interior of tee section 12e. Those of skill in the art will appreciate that absolute and relative dimensions in 6A and 6B are not to scale, as they are for general structural comparison purposes.

A side-by-side comparison of FIG. 6A, which features flat circular plate 22b described above, and FIG. 6B, which features a spherically concave circular plate 22b', reveals some important advantages of alternative plate 22b'. Flat circular plate 22b must be formed of relatively thick material, thereby rendering it heavy and difficult to handle. Spherically concave circular plate 22b' on the other hand may be seen to be formed of relatively thin material, thereby rendering it significantly lighter in weight and significantly easier to handle.

This is by virtue of the curvature of alternative plate 22b'.

Moreover, the central region of flat circular plate 22b may be seen to be farther from the turbine assembly, thus undesirably extending the length of the turbine's shaft. Conversely, the central region of spherically concave circular plate 22b' may be seen to be closer to the turbine assembly, thereby desirably shortening the required length or vertical span of the turbine's shaft.

This too is by virtue of the curvature of alternative plate 22b'.

From FIG. 6B, concave plate 22b' will be understood to be of generally spherical shape with the concavity extending inwardly from generator assembly (not shown for the sake of simplicity and clarity in this view) and toward the turbine assembly 96' (shown only schematically in these detailed views by way of dash-dot-dot outlines, and the only difference from turbine assembly 96 being the provision of a shorter shaft 64'). This inward or downwardly oriented concave circular plate may be thought of and described herein as an inverted dome (or inverted cupola). While a spherically concave shape is illustrated and described, those of skill in the art will appreciate that suitable modifications can be made thereto without departing from the spirit and scope of the invention. For example, an inverted dome featuring a parabolic rather than a semi-circular cross section is possible, as are other curvilinear cross sections of various aspect ratios (i.e. of various depth-to-width ratios only one of which is shown with some intentional depth exaggeration for the sake of clarity). Also, the cupola-shaped plate in cross section can have a more rounded upper shoulder, producing what might be thought of as complex curvature. All such suitable alternative configurations are contemplated as being within the spirit and scope of the invention.

Those of skill in the art will appreciate that mounting details in such an alternative embodiment are modified straightforwardly to accommodate inverted cupola-shaped circular plate 22b' and its bolted assembly through annular seal 22a onto standard flange 12e of pipe 12. For example, mounting block 24' may include a shim 22bb' that is spherically convexly curved to mate and seal the spherically concave curvature of the inside of the inverted cupola. Generator 32 will be understood to mount to, for rotation with, the distal end of the turbine's shaft directly above the opening in the central region of spherical concave plate 22b'. Other components and techniques for accommodating alternative spherically concave circular plate 22b' are contemplated as being within the spirit and scope of the invention.

A generator sub-assembly 28 bolts through a circular hole arrangement within circular plate 22b. Generator sub-assembly 28 includes an annular spacer or standoff 30 for housing a generator 32 couple-able with the turbine's shaft, an annular rim 34 with a first mechanical-lift tab 34a, and a cap 36 having a second mechanical-lift tab 36a. Those of skill in the art will appreciate that tabs 34a and 36a provide convenient tabs for lifting all or part of the assembled tee-section electrical power generation components during assembly, disassembly, or maintenance. Those of skill will appreciate that the generator can be direct or alternating current (DC or AC) and single-phase or 3-phase, synchronized 120 VAC or 240 VAC, etc. and/or can be converted from one to the other, depending upon the power grid requirements.

A mounting plate 12f is welded to pipe 12 around small opening 12c and a second mount 38 including a roller-bearing assembly that mounts a distal end of the shaft of turbine assembly 96 for smooth rotation therein. Those of skill in the art will appreciate that, to accommodate the circular cross section of cylindrical pipe 12, first mount 26 in accordance with one embodiment of the invention includes a shim (not shown in pertinent detail but believed to be understood from this brief description by those of skill in the art) having an exterior planar surface and an inner cylindrical surface for mating with the exterior cylindrical surface of the pipe. The shim can be machined or formed by any suitable process and of any suitable material that ensures conformingly sealing engagement between the shaft and the pipe opening through which the shaft extends. Either shim described and/or illustrated herein will be understood to be optional, as either can readily be incorporated into the corresponding mounting block or plate.

First and second mounts 26 and 38 can take alternative forms, within the spirit and scope of the invention, but it is believed that axial and radial thrust handling is best achieved using spherical roller bearings producing only rolling friction rather, for example, than sleeve bearings or other sliding friction arrangements. The roller bearing mounts described herein are believed to enable system 10 to operate safely, reliably and durably to produce electricity with a fluid flow rate through pipe 12 of as little as approximately 3-4 feet/second (fps).

Those of skill in the art will appreciate that turbine assembly 96 is slipped through large opening 12d of pipe 12 and the distal end of its shaft is secured to second mount 38. Generator assembly 14 is bolted onto flange 12e of pipe 12 and the hydro-electric power system 10 is ready to operate. Power system 10 is fitted into or otherwise rendered onto a part of a pipe system (not shown). When fluid flows through pipe 12, power system 10 generates electricity.

Surprisingly, it has been discovered that turbine assemblies such as that described and illustrated herein rotate at fluid flow rates as low as approximately 3-4 feet per second (fps).

Those of skill also will appreciate that the intentionally broad term "spheroidal" may be used instead of the term "spherical", or vice versa, wherein a spheroidal turbine that was slightly or somewhat out-of-round or oval in cross section could be used productively within a correspondingly somewhat out-of-round or oval in cross section cylindrical pipe. These and other variations on the invention are contemplated as being within the spirit and scope of the invention.

Figure 2:
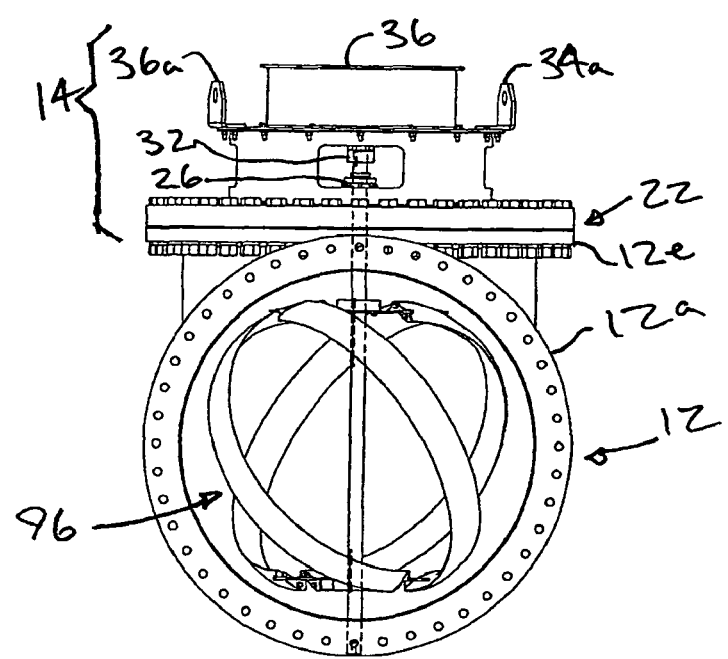
FIG. 2 is a front elevation of the assembled embodiment.

FIG. 2 is a side elevation of assembled system 10. FIG. 2 is believed to be largely self-explanatory in view of the detailed description above by reference to FIG. 1 to which it corresponds. It may be seen from FIG. 2 that the 'solidity' of the spherical turbine assembly is between approximately 15% and 30%, depending upon the number of blades in the plurality and their individual configuration and pitch. It will be appreciated that the angle of intersection of each of the plurality of spherical turbine blades and the central axis of the shaft in accordance with one embodiment of the invention is approximately 30 degrees, although other angles are contemplated as being within the spirit and scope of the invention. For example, the angle of intersection alternatively but within the spirit and scope of the invention may be between approximately 10 and 45 degrees, or more preferably between approximately 15 and 35 degrees, or most preferably between approximately 25 and 35 degrees. Any suitable angles within any useful ranges are contemplated as being within the spirit and scope of the invention.

The embodiment illustrated herein is a four-blade spherical turbine assembly, but as few as two blades and as many as twenty blades are contemplated as being within the spirit and scope of the invention. More preferably, between approximately two and eleven blades are contemplated. Most preferably, between approximately three and seven blades are contemplated. Other numbers and configurations of approximately 180 degree arced spherical turbine blades are contemplated as being within the spirit and scope of the invention. Those of skill in the art will appreciate best perhaps from FIG. 3 that the blades of the spherical turbine assembly are characterized along their entire length by airfoil cross section. This provides the turbine's hydrodynamics and efficiency at generating hydroelectric power. In accordance with this spherical-turbine embodiment of the invention, sufficient clearance around the rotating spherical turbine assembly and within the pipe is provided to avoid undue compression of fluid at the turbine sweep boundaries (see FIG. 2).

Those of skill will appreciate that the spherical turbine blades, within the spirit and scope of the invention, can be made of any suitable material and by any suitable process. For example, the blades can be made of aluminum, a suitable composite, or a suitable reinforced plastic material. The blades can be made by rotational or injection molding, extrusion, pultrusion, bending, or other forming techniques consistent with the material used and consistent with the costeffective production of elongated bodies having substantially constant cross sections. These and other useful materials and processes are contemplated as being within the spirit and scope of the invention.

In accordance with the illustrated embodiment of the invention, the air-foil cross section of the spherical turbine blades conforms with the recognized NACA 20 standard, although alternative air-foil cross sections are contemplated as being within the spirit and scope of the invention.

FIG. 3 is an isometric exploded assembly drawing of spherical turbine 96. Spherical turbine 96 includes upper and lower hub assemblies 98 and 100. Each hub assembly includes a hub plate 102 and four mounting brackets 104, 106, 108, and 110 (only the upper hub assembly being so designated for the sake of clarity). Hub plate 102 is flat and features a sawblade-like (alternately curvilinear to follow the circular cross-sectional outline of the rotation and straight to permit abutment and flush mounting of the ends of the blades) peripheral edge the straight portions of which mount the mounting brackets as shown. The mounting brackets in turn mount four spherical blades 112, 114, 116, and 118 each at a designated angle, e.g. preferably approximately 30 degrees, between the plane generally described by each curved blade and the central axis of the shaft. Those of skill in the art will appreciate that spherical blades 112, 114, 116, and 118 also are of airfoil cross section, e.g NACA 20 or any other suitable standard. Upper and lower split shaft couplers 120 and 122 are used to securely affix the hub assemblies to the shaft 64. In accordance with one embodiment of the invention, the mounting brackets bolted to the plural blades are affixed to the hub plates by welding, using the illustrated guide pins and holes for alignment. Suitable fasteners such as hex bolts, lock washers, and set screws are used to assemble the remaining component parts of spherical turbine assembly 96, as illustrated.

FIG. 4 is an isometric view of assembled spherical turbine 96. FIG. 4 is believed to be largely self-explanatory in view of the detailed description above by reference to FIG. 3 to which it corresponds. The dynamic clearance of the rotating spherical turbine assembly is greater than its static clearance, and is accommodated by slightly under-sizing the cylindrical turbine relative to the ID of the pipe, e.g. by providing a small but preferably constant clearance of between approximately 0.5 centimeters and 5 centimeters and preferably between approximately 1 centimeter and 3 centimeters, depending upon the diameter of pipe 12 and other application specifics. These spacings are illustrative only, and are not intended to be limiting, as alternative spacings are contemplated as being within the spirit and scope of the invention.

Figure 5:
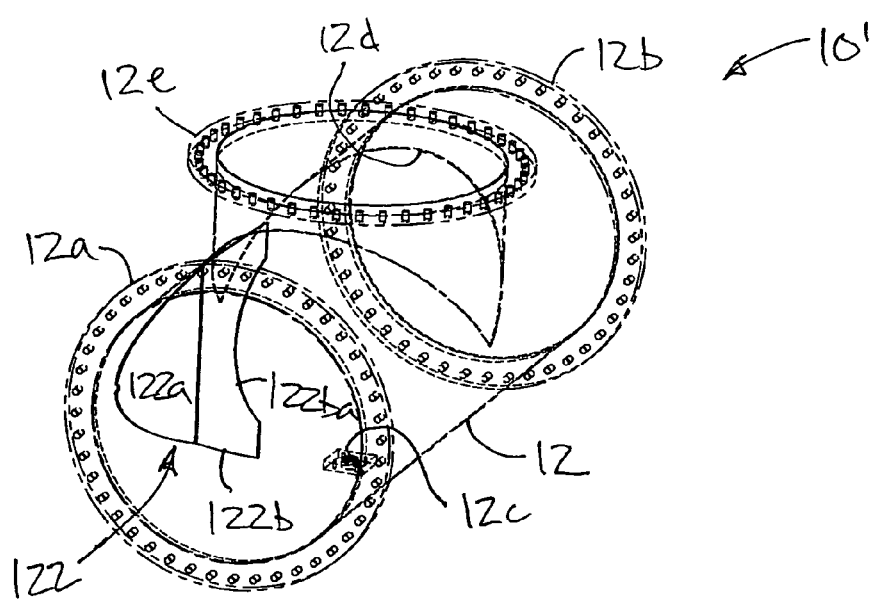
FIG. 5 is an isometric view of the assembled spherical turbine in a second embodiment of the invention including an upstream fluid deflector.

FIG. 5 illustrates the invented apparatus in accordance with another embodiment of the invention. Alternative system 10' is similar to system 10 described above, and thus uses identical reference designators for identical components and primed reference designators for similar components. System 10' may be seen further to include an upstream deflector 122 (for the sake of clarity, FIG. 5 omits the turbine and generator assembly details). Deflector 122 in accordance with one embodiment is made of two or more flat expanses including a first, less-inclined expanse 122a that curvilinearly conforms to the interior circular cross section of pipe 12 and a second, more-inclined expanse 122b that creates a concavely curved inner free edge 122ba that extend toward and generally conforms with the circularly cross-sectional spherical turbine. The two expanses are welded or otherwise joined along a mating line that defines a break in their angles of inclination relative to the central axis of the pipe. Deflector 122 in operation of system 10' thus effectively shields the outer rotational extent of the rotating blades of the spherical turbine in a rotational arc in which they are most weakly productive of energy and thus can produce undesirable stall at lower flow rates.

Surprisingly, it has been discovered that deflector 122 near an upstream region of turbine assembly 96 can increase the electrical energy production by between approximately 14% and 40% and more likely between approximately 20% and 30% over the nominal output of the spherical turbine without such an upstream deflector within the pipe.

Those of skill in the art will appreciate that the ratio between the deflector's coverage and the turbine's sweep can be between approximately 10% and 40% and more likely between approximately 20% and 30%. Those of skill in the art will also appreciate that the amount of deflector coverage may be application specific, as it represents a tradeoff between volumetric flow rate and head drop-off. Thus, alternative ranges of deflector coverage relative to turbine sweep are contemplated as being within the spirit and scope of the invention.

Those of skill also will appreciate that deflector 122 can be made of any suitable material, e.g. steel, and can be dimensioned and oriented for any desired fluid flow adjustment in the upstream region of spherical turbine assembly 96. In accordance with one embodiment of the invention, deflector 122 is inclined relative to the long central axis of pipe 12 at an angle of less than 90 degrees at its free edge 122ba. A so-called exit angle of the deflector's free edge relative to the central axis of pipe 12 preferably is between approximately 10 degrees and 40 degrees. In accordance with one embodiment of the invention, expanse 122a is inclined at approximately 15 degrees and expanse 122b is inclined at approximately 30 degrees from the central axis of pipe 12. Nevertheless, other inclined angles are contemplated as being within the spirit and scope of the invention.

Those of skill in the art will appreciate that deflector 122 can take different forms within the spirit and scope of the invention. For example, deflector 122 can have more and shorter piece-wise planar segments than two as it radiates inwardly toward the central axis of pipe 12, thus better approximating a smooth, and preferably circular-cylindrical curve the central axis of which is preferably approximately parallel with the turbine's axis of rotation (i.e. approximately parallel with the long axis of shaft 64). Indeed, deflector 122 within the spirit and scope of the invention can be smoothly cylindrically curved between its pipe-mating edge and its free edge.

The free edge 122ba of deflector 122 in accordance with one embodiment of the invention is concavely curved generally to conform its inward extent along its height with the general curve of the blades of the spherical turbine. Any suitable rectilinear or smooth curve or radius of curvature is contemplated as being within the spirit and scope of the invention.

Those of skill in the art will appreciate that the spherical turbine can serve in power conversion systems other than electric power generation. For example, axial kinetic energy of a fluid can be converted to rotating kinetic energy for any rotating machinery (e.g. a conveyor, a grinder, a drill, a saw, a mill, a flywheel, etc.) including an electric generator or suitable alternative. All such uses of the invented fluid turbine are contemplated as being within the spirit and scope of the invention.

Those of skill in the art will appreciate that orientation of the invented system in its many embodiments is illustrative only and should not be read as a limitation of the scope of the invention. Thus, use of terms like upper and lower will be understood to be relative not absolute, and are interchangeable. In other words, the system can assume either vertical orientation, within the spirit and scope of the invention, with the bulkhead housing the generator and the turbine shaft extending relative to the long axis of the pipe either up or down. Indeed, the system can assume any other suitable angle in which the shaft of the turbine extends approximately perpendicular to the direction of the fluid flow.

Those of skill in the art will appreciate that component parts of the invented systems can be made of any suitable material, including steel and aluminum. Most parts can be steel, for example, as are the turbine shafts, flat plates, and deflector. Remaining parts including hubs, coupling blocks, and blades can be made of machined, extruded, or pultruded aluminum (the blades then being roll-formed and/or bent into the desired form) or injection-molded, reinforced plastic. Any alternative material and any alternative forming process is contemplated as being within the spirit and scope of the invention.

Those of skill will also appreciate that the invented systems are of easily scaled dimension up or down, depending upon their application. So that while dimensions generally are not given herein, dimensions will be understood to be proportionately accurately illustrated, the absolute scale of which can be varied, within the spirit and scope of the invention.

Those of skill in the art will appreciate that two or more hydro-electric power generation systems can be installed at defined intervals (in series) within and along a water conveying pipe, thereby to multiply power generation. Those of skill in the art also will appreciate that parallel arrangements of two or more hydro-electric power generation systems can be installed within branches of a water conveying pipe, thereby alternatively or additionally to multiply power generation. Those of skill in the art will appreciate that kick-start mechanisms can be added to the hydro-electric power generation systems described and illustrated herein, if needed, for use of such systems in tidal (bidirectional, oscillating) flow applications. Those of skill will also appreciate that fail-safe modes of operation can be achieved in the use of the invented in-pipe hydro-electric power generation systems to prevent self-destruction in the event of bearing failure or the like. Finally, those of skill in the art will appreciate that such hydroelectric power generation systems as are described and illustrated herein can be placed within an exterior sleeve conduit that protects the power generation system from the elements and/or that facilitates power distribution along power cables or other suitable conveyances to nearby storage devices or power grids.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A generally spherical turbine comprising:
a central longitudinal shaft configured to mount and to rotate on a central axis perpendicular to a direction of fluid flow, and
a plurality of generally circularly arcing blades coupled with the shaft and extending radially outwardly from the shaft, the blades being substantially evenly spaced apart around the shaft, each of the blades extending such that a plane defined by them is not parallel to the central axis, and including along a substantial length of the blades an airfoil cross-section, the sweep of the blades defining a generally spherical shape when rotated with the shaft.

2. The turbine of claim 1, which further comprises:
opposing hub assemblies, each including a hub plate and a plurality of mounting brackets for securely affixing opposite ends of the corresponding plurality of blades to the shaft.

3. The turbine of claim 1, wherein each hub plate has a circular sawblade-like peripheral edge featuring a combination of curvilinear and rectilinear edge segments.

4. The turbine of claim 1, which further comprises:
opposing shaft couplers for securely affixing the corresponding hub assemblies to the shaft.

5. The turbine of claim 1, wherein the plurality of blades define a nominal solidity of between approximately 15% and approximately 30%.

6. The turbine of claim 1, an angle between the plane defined by each of the blades and the central axis of the shaft is between about 10 degrees and about 45 degrees.

7. A power generating system that generates power from the movement of fluids, the system comprising:
a turbine comprising:
a central longitudinal shaft configured to rotate within diametrically opposed mounts, the shaft configured to extend substantially perpendicularly to the fluid flow, with one end of the shaft configured to operatively couple with a piece of rotating machinery;
a plurality of bearings, the first one configured to mount the end of the shaft furthest from a generator to a support for rotation in a circular direction, and a second bearing configured to mount an intermediate part of the shaft to a support for rotation, with the shaft extending through the second of the bearings; and
a plurality of blades coupled with the shaft between the pair of bearings, the blades extending radially outwardly from the shaft, the blades being substantially evenly spaced apart around the shaft and each of the blades extending such that a plane defined by them is not parallel to the central axis.

8. The system of claim 7, wherein each of the plurality of blades of the turbine is curved in an approximate 180 degree arc.

9. The system of claim 7, wherein each of the plurality of blades of the turbine includes an airfoil cross-section along substantially the entire length of each blade.

10. The system of claim 7, wherein the overall shape of the turbine is generally spherical.

11. The system of claim 7, which further comprises:
a pair of opposing generally circular hubs attached to the shaft of the generally spherical turbine, each hub having plural mounting brackets affixed thereto at radially spaced intervals around their circumference, the plural brackets mounting opposing ends of the plurality of blades.

12. The system of claim 7 further comprising:
an electric generator operatively coupled with the proximal end of the shaft for rotation with the shaft to produce electric power in response to fluid flow.

13. The system of claim 7, wherein the turbine is configured to rotate in the same direction, regardless of the direction of fluid flow.

14. The system of claim 7, wherein the mounts securing the turbine shaft include bearings.

15. The system of claim 7, wherein an angle between the plane defined by each of the blades and the central axis of the shaft is between about 10 degrees and about 45 degrees.

16. An electric power generating system that generates power from the movement of fluids through a pipe, the system comprising:
a turbine comprising:
a central longitudinal shaft configured to rotate within diametrically opposed mounts within a generally cylindrical pipe, the shaft configured to extend substantially perpendicularly to the long axis of the generally cylindrical pipe, with one end of the shaft configured to operatively couple with an electric generator;
a plurality of bearings, the first one configured to mount the end of the shaft furthest from the generator to the sidewall of a generally cylindrical pipe for rotation in a circular direction, and a second bearing configured to mount an intermediate part of the shaft for rotation within the generally cylindrical water pipe, with the shaft extending through the second of the bearings; and
a plurality of blades coupled with the shaft between the bearings, the blades extending radially outwardly from the shaft, and each of the blades extending such that a plane defined by them is not parallel to the central axis.

17. The system of claim 16, wherein each of the plurality of blades of the turbine is curved in an approximate 180 degree arc.

18. The system of claim 16, wherein each of the plurality of blades of the turbine includes an airfoil cross-section along substantially the entire length of each blade.

19. The system of claim 16, wherein the overall shape of the turbine is generally spherical.

20. The system of claim 16, which further comprises:
a pair of opposing generally circular hubs attached to the shaft of the generally spherical turbine, each hub having plural mounting brackets affixed thereto at radially spaced intervals around their circumference, the plural brackets mounting opposing ends of the plural blades.

21. The system of claim 16, further comprising:
a generally cylindrical pipe configured with a diameter slightly greater than the distance between the pair of hubs on the turbine shaft, the generally cylindrical pipe mounting the turbine for rotation therein in response to fluid flow through the generally cylindrical pipe.

22. The system of claim 16, further comprising:
a generally cylindrical pipe configured with a diameter slightly greater than the distance between the pair of hubs on the turbine shaft, the generally cylindrical pipe mounting the turbine for rotation therein in response to fluid flow through the generally cylindrical pipe, the pipe including one or more deflector plates attached to the sidewall thereof immediately upstream from the generally spherical turbine, the one or more deflectors inclined towards the turbine in the direction of turbine rotation at an angle of less than 90 degrees to a plane perpendicular to the long axis of the pipe, each of the one or more deflectors having an inward curved edge approximating the shape of the turbine on a side of each deflector farthest from where the corresponding deflector attaches to the sidewall of the pipe, with the one or more deflectors covering a portion of a cross-sectional area of the pipe.

23. The system of claim 16, further comprising:
an electric generator operatively coupled with a proximal end of the shaft for rotation therewith to produce electric power in response to fluid flow through the generally cylindrical pipe.

24. The system of claim 16, wherein the turbine is configured to rotate in the same direction, regardless of the direction of fluid flow through the pipe.

25. The system of claim 16, wherein the mounts securing the turbine shaft include bearings.

26. The system of claim 16, further comprising:
a generally cylindrical tee section configured to mount to an outer sidewall of the generally cylindrical pipe, the tee section housing an electric generator that is operatively coupled for rotation with the shaft of the turbine to produce electric power when the turbine is rotating.

27. The system of claim 26, which further comprises:
a cylindrically arched plate configured to cover an access hole in the generally cylindrical pipe to substantially prevent water flow into the generally cylindrical tee section.

28. The system of claim 26, which further comprises:
a circular flat or concave plate that covers the access hole into the generally cylindrical tee section.

29. The system of claim 28, which further comprises:
a generator that sits on top of the circular flat or concave plate.

30. The system of claim 16, wherein an angle between the plane defined by each of the blades and the central axis of the shaft is between about 10 degrees and about 45 degrees.

* * * * *